United States Patent [19]
Kurokami

[11] Patent Number: 5,331,663
[45] Date of Patent: Jul. 19, 1994

[54] DECISION-FEEDBACK EQUALIZER CAPABLE OF PRODUCING AN EQUALIZED SIGNAL AT A HIGH SPEED WITHOUT A REMAINING FADING

[75] Inventor: Yuzo Kurokami, Tokyo, Japan

[73] Assignee: NEC Corporation, Tokyo, Japan

[21] Appl. No.: 944,292

[22] Filed: Sep. 14, 1992

[30] Foreign Application Priority Data

Sep. 12, 1991 [JP] Japan .................................. 3-233280

[51] Int. Cl.$^5$ ........................ H03H 7/30; H03H 7/40; H03K 5/159
[52] U.S. Cl. .................................... 375/14; 375/16; 364/724.2
[58] Field of Search ........................... 375/14, 15, 16; 364/724.19, 724.2

[56] References Cited

U.S. PATENT DOCUMENTS

| | | | |
|---|---|---|---|
| 5,097,482 | 3/1992 | Serizawa et al. | 375/14 X |
| 5,119,401 | 6/1991 | Tsujimoto | 375/14 |
| 5,150,379 | 9/1992 | Baugh et al. | 375/14 |
| 5,214,671 | 5/1993 | Nakai | 375/14 |

OTHER PUBLICATIONS

John G. Proakis, "Digital Communications", McGraw-Hill International Book Company, pp. 382–385.

Primary Examiner—Stephen Chin
Assistant Examiner—Bryan Webster
Attorney, Agent, or Firm—Sughrue, Mion, Zinn, Macpeak & Seas

[57] ABSTRACT

In a decision-feedback equalizer for use in combination with a demodulator (13) to equalize a demodulated signal into an equalized signal through a transversal filter (15), the transversal filter filters the demodulated signal into a filtered signal in accordance with a plurality of controllable tap gains. The filtered signal is processed into the equalized signal on the basis of the binary level of the filtered signal. The controllable tap gains are produced dependent on the demodulated and the equalized signal and a plurality of parameters. A delivering circuit (38) delivers limiting values as the parameters to the transversal filter when the demodulator is put in a synchronization state. The delivering circuit delivers additional values as the parameters to the transversal filter when the demodulator is put out of the synchronization state.

7 Claims, 4 Drawing Sheets

DECISION-FEEDBACK EQUALIZER CAPABLE OF PRODUCING AN EQUALIZED SIGNAL AT A HIGH SPEED WITHOUT A REMAINING FADING

BACKGROUND OF THE INVENTION

This invention relates to a decision-feedback equalizer for use in equalizing a demodulated signal sent from a demodulator.

In general, a demodulator is operable in response to a received signal sent through a radio channel to demodulate the received signal into a demodulated signal. The received signal may be seriously subjected to fading during transmission. The demodulated signal may be a baseband signal having a binary level or multilevel. A decision-feedback equalizer of the type described is supplied with the demodulated signal and is operated to equalize the demodulated signal into an equalized signal. As a result, the fading is moved from the equalized signal which is put into a fading-free state.

A conventional decision-feedback equalizer comprises a transversal filter having first and second filter sections. The first filter section filters the demodulated signal into a first filtered signal in accordance with first through N-th primary controllable tap gains, where N represents a positive integer. The second filter section filters an input signal into a second filtered signal in accordance with first through M-th subsidiary controllable tap gains, where M represents a positive number. The conventional decision-feedback equalizer further comprises a first producing section for producing a third filtered signal dependent upon the first and the second filtered signals, a second producing section for producing the equalized signal dependent upon the third filtered signal, and a control section for controlling the first through the N-th primary controllable tap gains and the first through the M-th subsidiary controllable tap gains dependent upon the demodulated signal and the equalized signal.

Such a conventional decision-feedback equalizer is disclosed in "DIGITAL COMMUNICATIONS" which is issued by McGRAW-HILL INTERNATIONAL BOOK COMPANY and which is written by John G. Proakis, Professor of Electrical Engineering in Northeastern University.

However, the fading inevitably and partially remains as a remaining fading in the equalized signal in the above-referred decision-feedback equalizer when the received signal is subjected to a large fading through the radio channel. As a result, the primary and the subsidiary controllable tap gains are not quickly controlled by the control section because the remaining fading remains in the equalized signal. Therefore, it is difficult for the conventional decision-feedback equalizer of the above-mentioned type to quickly equalize the demodulated signal into the equalized signal without a remaining fading.

SUMMARY OF THE INVENTION

It is an object of this invention to provide a decision-feedback equalizer capable of quickly producing an equalized signal which substantially has no remaining fading.

Other objects of this invention will become clear as the description proceeds.

On describing the gist of this invention, it should at first be understood that a decision-feedback equalizer is connected to a demodulator section for demodulating a received signal into a demodulated signal. According to this invention, the decision-feedback equalizer comprises first filter means for filtering the demodulated signal into a first filtered signal in accordance with first through N-th primary controllable tap gains, where N represents a positive integer, delay means for delaying the demodulated signal during a predetermined time to produce a delayed signal, main filter means for filtering the delayed signal into a main filtered signal in accordance with a main controllable tap gain, second filter means for filtering an input signal into a second filtered signal in accordance with first through M-th subsidiary controllable tap gains, where M represents a positive number, first producing means for producing a third filtered signal dependent upon the first and the second filtered signals and the main filtered signal, second producing means for producing an equalized signal as the input signal dependent upon the third filtered signal, error signal producing means for producing an error signal dependent upon the equalized signal and the third filtered signal, first generating means for generating first through N-th primary gain values dependent upon the demodulated signal and the error signal, main generating means for generating a main gain value dependent upon the delayed signal and the error signal, and second generating means for generating first through M-th subsidiary gain values dependent upon the error signal and the equalized signal. The equalizer further comprises detecting means for detecting whether or not the demodulator section is put in a synchronization state to produce a first detecting signal when the demodulator section is put in the synchronization state. The detecting means produces a second detecting signal when the demodulator section is put out of the synchronization state. In addition, the equalizer comprises first processing means for processing the first through the N-th primary gain values into the first through the N-th primary controllable tap gains in accordance with first through N-th primary parameters, respectively, main processing means for processing said main gain value into the main controllable tap gain in accordance with a main parameter, second processing means for processing the first through the M-th subsidiary gain values into the first through the M-th subsidiary controllable tap gains in accordance with first through M-th subsidiary parameters, respectively, first delivering means responsive to any one of the first and the second detecting signals for delivering a main value as the main parameter to the main processing means, second delivering means responsive to the first detecting signal for delivering first through N-th primary values and first through M-th subsidiary values as the first through the N-th primary parameters and the first through the M-th subsidiary parameters to the first and the second processing means, respectively, and third delivering means responsive to the second detecting signal for delivering first through N-th additional primary values and first through M-th additional subsidiary values as the first through the N-th primary parameters and the first through the M-th subsidiary parameters to the first and the second processing means, respectively.

DESCRIPTION OF THE PREFERRED EMBODIMENT

Figure 1:
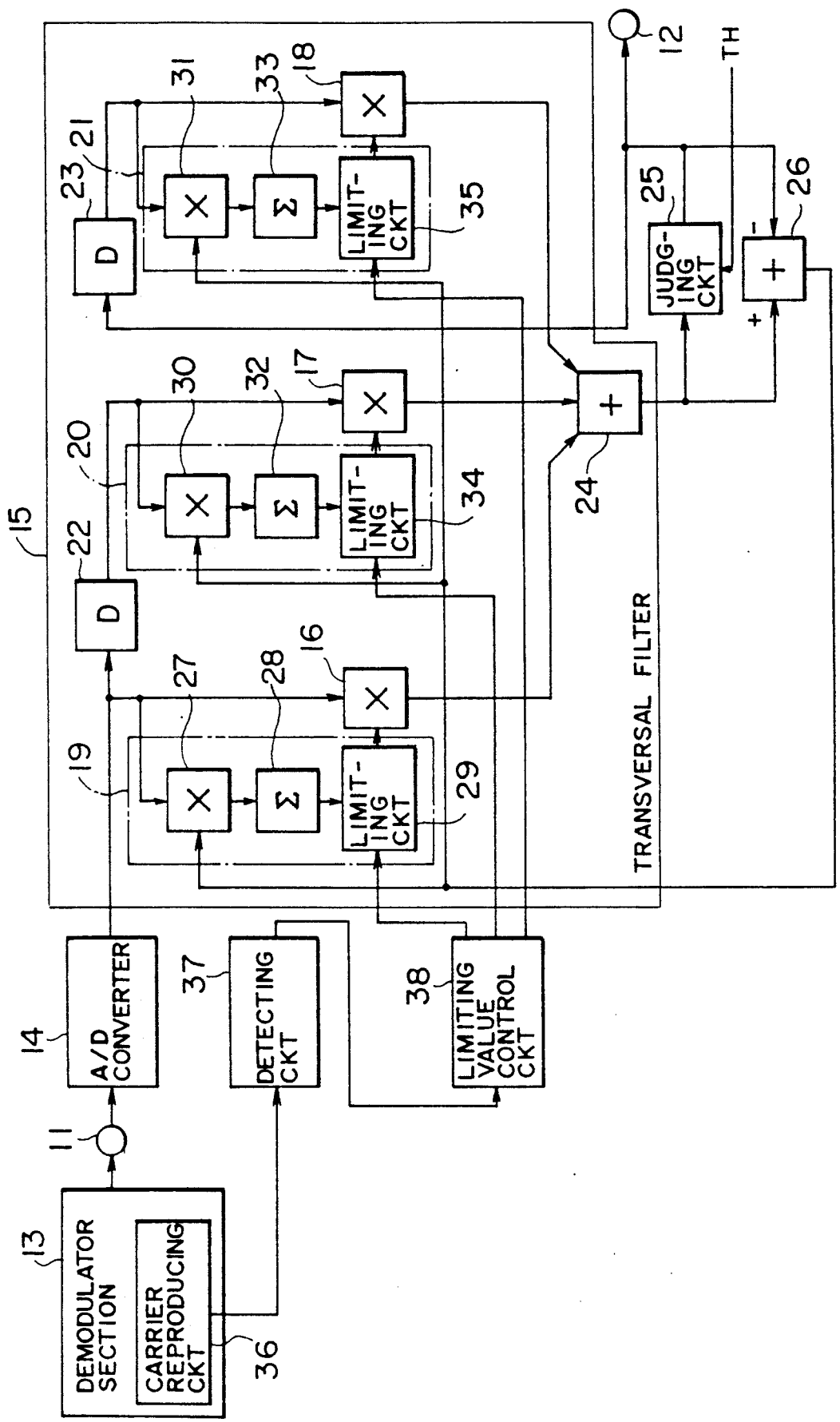
FIG. 1 is a block diagram of a decision-feedback equalizer according to a preferred embodiment of this invention.

Referring to FIG. 1, description will be made as regards a decision-feedback equalizer according to a preferred embodiment of this invention. The illustrated decision-feedback equalizer has equalizer input and output terminals 11 and 12. The input terminal 11 is connected to a demodulator section 13. Through a radio channel, a transmitted signal is supplied from a transmitter (not shown) to the demodulator section 13 as a received signal which is subjected to fading during transmission. The transmitted signal may be, for example, a modulated signal into which a carrier signal is modulated by a digital signal in the transmitter. The digital signal is produced in the transmitter by sampling an analog signal at a sampling frequency f. The analog signal may be, for example, a speech signal.

At any rate, the demodulator section 13 demodulates the received signal into a demodulated signal to supply the demodulated signal to the input terminal 11 of the decision-feedback equalizer. The demodulated signal may be a baseband signal having a binary level or a multilevel. The demodulated signal is converted into a digital demodulated signal by an analog-digital (A/D) converter 14. The remaining parts of the illustrated decision-feedback equalizer serve to equalize the digital demodulated signal into an equalized signal for supplying the output terminal 12 with the equalized signal.

The decision-feedback equalizer comprises a transversal filter 15 having first, main, and second filter sections each of which has at least one tap. The first filter section serves to filter the digital demodulated signal into a first filtered signal in accordance with first through N-th primary controllable tap gains, where N represents a positive integer and is equal to the tap number of the first filter section. The main filter section receives a first delay signal which is produced by delaying the digital demodulated signal during a predetermined time and filters the first delayed signal into a main filtered signal in accordance with a main controllable tap gain. The second filter section acts to filter an input signal supplied thereto into a second filtered signal in accordance with first through M-th subsidiary controllable tap gains, where M represents a positive number and is equal to the tap number of the second filter section. In the illustrated example, the positive integer N and the positive number M are equal to one, respectively. The first, the main, and the second filter sections only have first, main, and second multipliers 16, 17, and 18, respectively.

The first primary, the main, and the first subsidiary controllable tap gains are supplied from first, main, and second tap gain control circuits 19, 20, and 21 to the first, the main, and the second multipliers 16, 17, and 18, respectively.

The transversal filter 15 further comprises first and second delay circuits 22 and 23 and a filter adder 24. Each of the first and the second delay circuits 22 and 23 gives a delay of the predetermined time (1/f) to a signal supplied thereto. As shown in FIG. 1, the digital demodulated signal is supplied to the first delay circuit 22 and the first multiplier 16. The first delay circuit 22 successively provide the above-mentioned delay to supply the first delayed signal to the main multiplier 17.

Supplied with the first primary controllable tap gain in the manner which will be described hereinafter, the first multiplier 16 multiplies the digital demodulated signal by the first primary controllable tap gain to supply a first multiplied signal as the first filtered signal to a filter adder 24. Supplied with the main controllable tap gain, the main multiplier 17 multiplies the first delayed signal by the main controllable tap gain to supply a main multiplied signal as the main filtered signal to the filter adder 24.

The above-mentioned input signal is supplied to the second delay circuit 23. The second delay circuit 23 supplies a second delayed signal to the second multiplier 18.

Supplied with the first subsidiary controllable tap gain, the second multiplier 18 multiplies the second delayed signal by the first subsidiary controllable tap gain to supply a second multiplied signal as the second filtered signal to the filter adder 24.

The filter adder 24 calculates a total sum of the first, the main, and the second filtered signals to deliver the total sum as a third filtered signal to a judging circuit 25 and a subtractor 26.

The judging circuit 25 is given a predetermined threshold level TH from a threshold circuit (not shown). The judging circuit 25 at first judges the third filtered signal whether or not a binary level of the third filtered signal exceeds the predetermined threshold level to decide a judged binary level for the third filtered signal.

The judging circuit 25 thereby produces a judged signal specifying the judged binary level. The judging circuit 25 delivers the judged signal to the output terminal 12, the second delay circuit 23, and the subtractor 26. The judged signal is outputted as the equalized signal from the output terminal 12. The second delay circuit 23 receives the judged signal as the above-mentioned input signal. The subtractor 26 subtracts the third filtered signal from the judged signal to supply an error signal to the first, the main, and the second tap gain control circuits 19, 20, and 21.

Further referring to FIG. 1, the first tap gain control circuit 19 comprises a first correlation multiplier 27, a first integrator 28, and a first limiting circuit 29. The first correlation multiplier 27 multiplies the digital demodulated signal by the error signal to supply a first correlation multiplied signal to the first integrator 28. The first integrator 28 successively integrates the first correlation multiplied signal into a first integrated signal to supply the first integrated signal as a first primary gain value to the first limiting circuit 29.

Similarly, the main and the second tap gain control circuits 20 and 21 comprise main and second correlation multipliers 30 and 31, main and second integrators 32 and 33, and main and second limiting circuits 34 and 35, respectively. The main and the second correlation multipliers 30 and 31 multiply the first and the second delayed signals by the error signal, respectively. The main and the second correlation multipliers 30 and 31 supply main and second correlation multiplied signals to the main and the second integrators 32 and 33, respectively. The main and the second integrators 32 and 33 successively integrate the main and the second correlation multiplied signals into main and second integrated signals, respectively. The main and the second integrators 32 and 33 supply the main and the second integrated signals as main and first subsidiary gain values to the main and the second limiting circuits 34 and 35, respectively.

Again referring to FIG. 1, the demodulator section 13 comprises a carrier reproducing circuit 36 for reproducing the carrier signal in synchronism with the received signal. When the carrier signal is reproduced from the received signal, the carrier reproducing circuit 36 produces a first control signal to supply the first control signal to a detecting circuit 37. When the carrier signal is not synchronized with the received signal, the carrier reproducing circuit 36 supplies a second control signal to the detecting circuit 37. The detecting circuit 37 is disclosed in Japanese Unexamined Patent Publication No. 17661/1973 (Tokkai Syô 48-17661).

When supplied with the first control signal, the detecting circuit 37 knows that the demodulator section 13 is put in a carrier synchronization state. The detecting circuit 37 delivers a synchronization signal to a limiting value control circuit 38. When supplied with the second control signal, the detecting circuit 37 knows that the demodulator section 13 is put out of the carrier synchronization state. The detecting circuit 37 delivers a non-synchronization signal to the limiting value control circuit 38.

Figure 2:
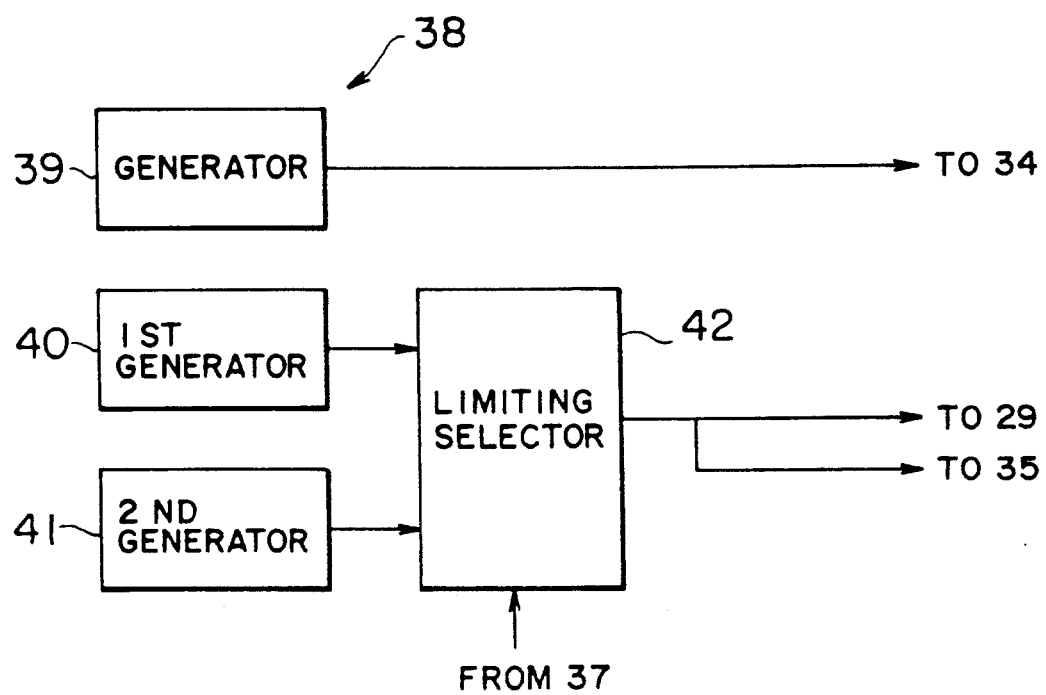
FIG. 2 is a block diagram of a limiting value control circuit used in the decision-feedback equalizer illustrated in FIG. 1.

Referring to FIG. 2 together with FIG. 1, the limiting value control circuit 38 comprises a main generator 39 and first and second generators 40 and 41. The main generator 39 and the first and the second generators 40 and 41 generate a main value signal and first and second value signals, respectively. In the illustrated example, the main value signal is representative of 1. The first value signal is representative of a value between one and ten (one only exclusive). The second value signal is representative of a positive value which is less than one. For example, the first and the second value signals are representative of 2 and ½, respectively. The main value signal is supplied to the main limiting circuit 29 as a main parameter. The first and the second value signals are delivered to a limiting selector 42 which is selectively given the synchronization and the non-synchronization signals from the detecting circuit 37. When supplied with the synchronization signal, the limiting selector 42 selects the first value signal from the first and the second value signals to supply the first value signal to the first and the second limiting circuits 29 and 35 as first primary and first subsidiary parameters, respectively. When supplied with the non-synchronization signal, the limiting selector 42 selects the second value signal from the first and the second value signals to supply the second value signal to the first and the second limiting circuits 29 and 35 as first primary and first subsidiary parameters, respectively.

The first value signal is supplied from the limiting value control circuit 38 to the first limiting circuit 29 as the first primary parameter when the demodulator section 13 is put in the carrier synchronization state. Similarly, the second value signal is supplied from the limiting value control circuit 38 to the first limiting circuit 29 as the first primary parameter when the demodulator section 13 is put out of the carrier synchronization state. The first limiting circuit 29 processes the first primary gain value into the first controllable tap gain in accordance with the first primary parameter.

Figure 3:
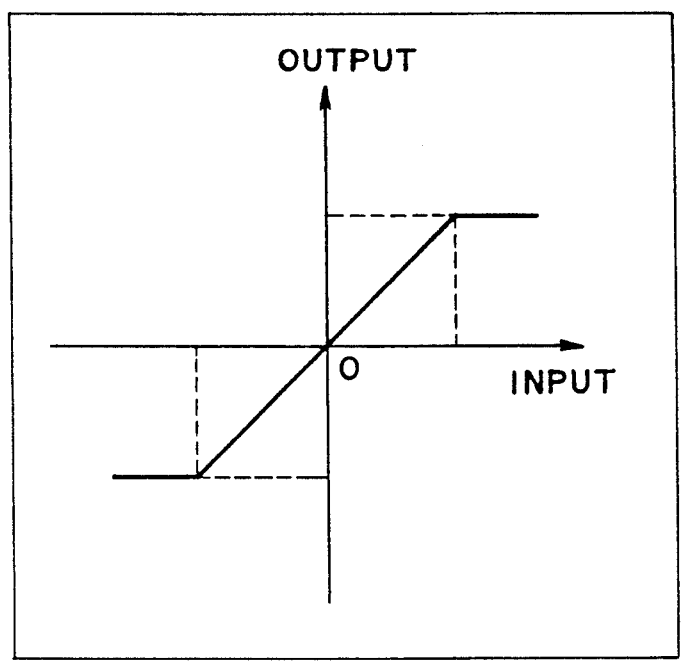
FIG. 3 is an input-output characteristic of a first limiting circuit illustrated in FIG. 1.

Referring to FIG. 3 in addition to FIG. 1, the first limiting circuit 29 supplies the first primary gain value as the first primary controllable tap gain to the first multiplier 16 when the absolute value of the first primary gain value is not greater than the first primary parameter. When the absolute value of the first primary gain value is greater than the first primary parameter, the first limiting circuit 29 limits the absolute value of the first primary gain value to the first primary parameter to produce a limited gain value of which absolute value is equal to the first primary parameter. The limited gain value is supplied as the first primary controllable tap gain from the first limiting circuit 29 to the first multiplier 16.

Turning to FIG. 1, the main value signal is supplied from the limiting value control circuit 38 to the main limiting circuit 34 as the main parameter when the demodulator section 13 is either put in or out of the carrier synchronization state. The main limiting circuit 34 processes the main gain value into the main controllable tap gain in accordance with the main parameter in a similar manner described in connection with FIG. 3.

The first value signal is supplied from the limiting value control circuit 38 to the second limiting circuit 35 as the first subsidiary parameter when the demodulator section 13 is put in the carrier synchronization state. Similarly, the second value signal is supplied from the limiting value control circuit 38 to the second limiting circuit 35 as the first subsidiary parameter when the demodulator section 13 is put out of the carrier synchronization state. The second limiting circuit 41-2 processes the second gain value into the second controllable tap gain in accordance with the first subsidiary parameter.

Figure 4:
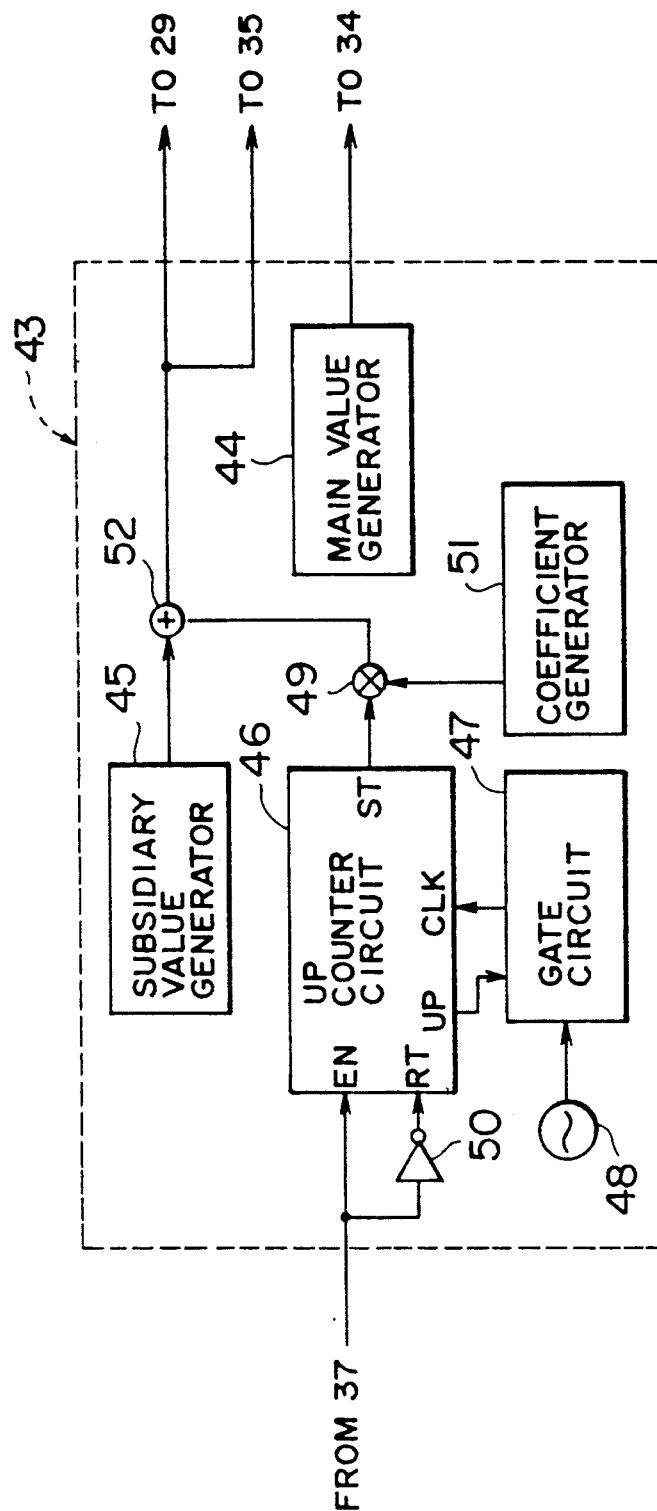
FIG. 4 is a block diagram of another limiting control circuit used in the decision-feedback equalizer illustrated in FIG. 1.

Referring to FIG. 4 in addition to FIG. 1, description will be made as regards another example of a limiting value control circuit. The illustrated limiting value control circuit is different in structure from the limiting value control circuit 38 illustrated in FIG. 3 and is therefore designated afresh by a reference numeral 43. The limiting value control circuit 43 comprises a main value generator 44 and a subsidiary value generator 45. Supplied with any one of the synchronization and the non-synchronization signals, the main value and the subsidiary value generators 44 and 45 generate main and subsidiary value signals which are representative of main and subsidiary values, respectively. The main and the subsidiary values are equal, for example, to 1 and ½, respectively.

The limiting value control circuit 43 further comprises an up counter circuit 46 connected to the detecting circuit 37. The up counter circuit 46 has an enable terminal labelled "EN", a reset terminal labelled "RT", a clock input terminal labelled "CLK", a count up terminal labelled "UP" and a signal output terminal labelled "ST". The up counter circuit 46 is connected to a gate circuit 47 through the clock input terminal CLK and the count up terminal UP. The gate circuit 47 is further connected in turn to a clock oscillator 48. The gate circuit 47 is operable to selectively supply clock pulses from the clock oscillator 48 to the up counter circuit 46. The gate circuit 47 stops supplying the clock pulses to the up counter circuit 46 in response to a carry signal which will presently be described.

As described above in conjunction with FIG. 1, the detecting circuit 37 supplies the synchronization signal to the limiting value control circuit 43 when the demodulator section 13 is put in the carrier synchronization state. When the demodulator section 13 is put out of the carrier synchronization state, the detecting circuit 37 supplies the non-synchronization signal to the limiting value control circuit 43. The synchronization and the non-synchronization signals may be high and low level signals, respectively.

Referring to FIG. 4 alone, the up counter circuit 46 has an initial count which may be equal to zero. When supplied with the synchronization signal from the enable terminal EN, the up counter circuit 46 counts up the clock pulses to produce a count. From the signal output terminal ST, the up counter circuit 46 supplies a limiting multiplier 49 with a count signal which is representative of the count. When the count reaches a predetermined number M such as $2^{10}$, the up counter circuit 46 supplies the carry signal to the gate circuit 47 through the count up terminal UP. Responsive to the carry signal, the gate circuit 47 stops supplying the clock pulses to the counter circuit 46. The up counter circuit 46 continues supplying the limiting multiplier 49 with the count signal which is representative of the predetermined number M.

Supplied with the non-synchronization signal from the detecting circuit 37, an inverter gate 50 inverts the synchronization signal into an inverted signal to supply the inverted signal to the up counter circuit 46. When supplied with the inverted signal at the reset terminal RT, the up counter circuit 46 is reset into the initial count and stops supplying the carry signal to the gate circuit 47. As a result, the gate circuit 47 serves to selectively supply the clock pulses to the counter circuit 46.

As described above, the count signal is supplied to the limiting multiplier 49. The limiting multiplier 49 is connected to a coefficient generator 51 for generating a coefficient signal representative of a predetermined coefficient K. The predetermined coefficient K is given by:

$$K=(P-Q)/M, \qquad (1)$$

where P represents the main value and Q represents the subsidiary value.

The limiting multiplier 49 multiplies the count signal by the coefficient signal to supply a limiting multiplied signal to a limiting adder 52. The limiting multiplied signal is supplied together with the subsidiary value signal to the limiting adder 52. The limiting adder 52 adds the subsidiary value signal to the limiting multiplied signal to produce a sum signal. The limiting adder 52 supplies the sum signal to the first and the second limiting circuits 29 and 35 (FIG. 1) as the first primary and first subsidiary parameters, respectively. The main value signal is supplied from the main value generator 51 to the main limiting circuit 34 (FIG. 1) as the main parameter.

While this invention has thus far been described in conjunction with a preferred embodiment thereof, it will readily be possible for those skilled in the art to put this invention into practice in various other manners. For example, the input terminal 11 may be directly connected to the transversal filter 15 without the A/D converter 14 when the demodulated signal is given as an intermediate-frequency (IF) signal. Furthermore, the judging circuit 30 judges the equalized signal in accordance with a plurality of threshold levels to produce the judged signal when the demodulated signal has a multilevel.

What is claimed is:

1. A decision-feedback equalizer for use in combination with a demodulator section for demodulating a received signal into a demodulated signal, said decision-feedback equalizer comprising:

first filter means for filtering said demodulated signal into a first filtered signal in accordance with first through N-th primary controllable tap gains, where N represents a positive integer;

delay means for delaying said demodulated signal during a predetermined time to produce a delayed signal;

main filter means for filtering said delayed signal into a main filtered signal in accordance with a main controllable tap gain;

second filter means for filtering an input signal into a second filtered signal in accordance with first through M-th subsidiary controllable tap gains, where M represents a positive number;

first producing means for producing a third filtered signal dependent upon said first and said second filtered signals and said main filtered signal;

second producing means for producing an equalized signal as said input signal dependent upon said third filtered signal;

error signal producing means for producing an error signal dependent upon said equalized signal and said third filtered signal; (claim 1 continued)

first generating means for generating first through N-th primary gain values dependent upon said demodulated signal and said error signal;

main generating means for generating a main gain value dependent upon said delayed signal and said error signal;

second generating means for generating first through M-th subsidiary gain values dependent upon said error signal and said equalized signal;

detecting means for detecting whether or not said demodulator section is put in a synchronization state to produce a first detecting signal when said demodulator section is put in said synchronization state, said detecting means producing a second detecting signal when said demodulator section is put out of said synchronization state;

first processing means for processing said first through said N-th primary gain values into said first through said N-th primary controllable tap gains in accordance with first through N-th primary parameters, respectively;

main processing means for processing said main gain value into said main controllable tap gain in accordance with a main parameter;

second processing means for processing said first through said M-th subsidiary gain values into said first through said M-th subsidiary controllable tap gains in (claim 1 twice continued) accordance with first through M-th subsidiary parameters, respectively;

first delivering means responsive to any one of said first and said second detecting signals for delivering a main value as said main parameter to said main processing means;

second delivering means responsive to said first detecting signal for delivering first through N-th primary values and first through M-th subsidiary values as said first through said N-th primary parameters and said first through said M-th subsidiary parameters to said first and said second processing means, respectively, and third delivering means responsive to said second detecting signal for delivering first through N-th additional primary values and first through M-th additional subsidiary values as said first through said N-th primary parameters and said first through said M-th subsidiary parameters to said first and said second processing means, respectively.

2. A decision-feedback equalizer as claimed in claim 1, said third filtered signal being a binary signal specified by a binary level, wherein said second producing means comprises:

judging means for judging whether or not a binary level of said third filtered signal exceeds a predetermined threshold level to decide a judged binary level for said third filtered signal and to thereby (claim 2 continued) produce an equalized signal specifying said judged binary level; and supplying means for supplying said equalized signal as said input signal to said second filtering means.

3. A decision-feedback equalizer as claimed in claim 1, said third filtered signal being a multilevel signal having a plurality of levels greater than two, wherein said second producing means comprises:

judging means for judging which one of said levels said multilevel signal has as a judged level to produce an equalized signal representative of said judged level; and supplying means for supplying said equalized signal as said input signal to said second filtering means.

4. A decision-feedback equalizer as claimed in claim 1, wherein said first through said N-th primary values are greater than said first through said N-th additional primary values, said first through said M-th subsidiary values are greater than said first through said M-th additional subsidiary values.

5. A decision-feedback equalizer as claimed in claim 1, wherein said first through said N-th primary values and said first through said M-th subsidiary values are a common predetermined value, said first through said N-th additional primary values and said first through (claim 5 continued) said M-th additional subsidiary values being a common prescribed value.

6. A decision-feedback equalizer as claimed in claim 5, wherein said common predetermined value is a value between one and ten (one only exclusive), said common prescribed value being a positive value which is less than one.

7. A decision-feedback equalizer as claimed in claim 6, wherein said second delivering means increments said common prescribed value into an incremented value in accordance with a preselected value in response to said first detecting signal until said incremented value reaches said common predetermined value.

* * * * *

UNITED STATES PATENT AND TRADEMARK OFFICE
CERTIFICATE OF CORRECTION

PATENT NO. : 5,331,663
DATED : July 19, 1994
INVENTOR(S) : Yuzo Kurokami

It is certified that error appears in the above-indentified patent and that said Letters Patent is hereby corrected as shown below:

Column 8, line 27, delete "(claim 1 continued)";

line 55, delete "(claim 1 twice continued)".

Column 9, line 16, delete "(claim 2 continued)".

Column 10, line 14, delete "(claim 5 continued)".

Signed and Sealed this

Sixth Day of December, 1994

*Attest:*

BRUCE LEHMAN

*Attesting Officer*  *Commissioner of Patents and Trademarks*